H. L. DOHERTY.
PROCESS OF PURIFYING GASES.
APPLICATION FILED FEB. 15, 1910.

1,038,315.

Patented Sept. 10, 1912.

2 SHEETS—SHEET 1.

Witnesses:

Henry L. Doherty, Inventor
By his Attorney Frank S. Young

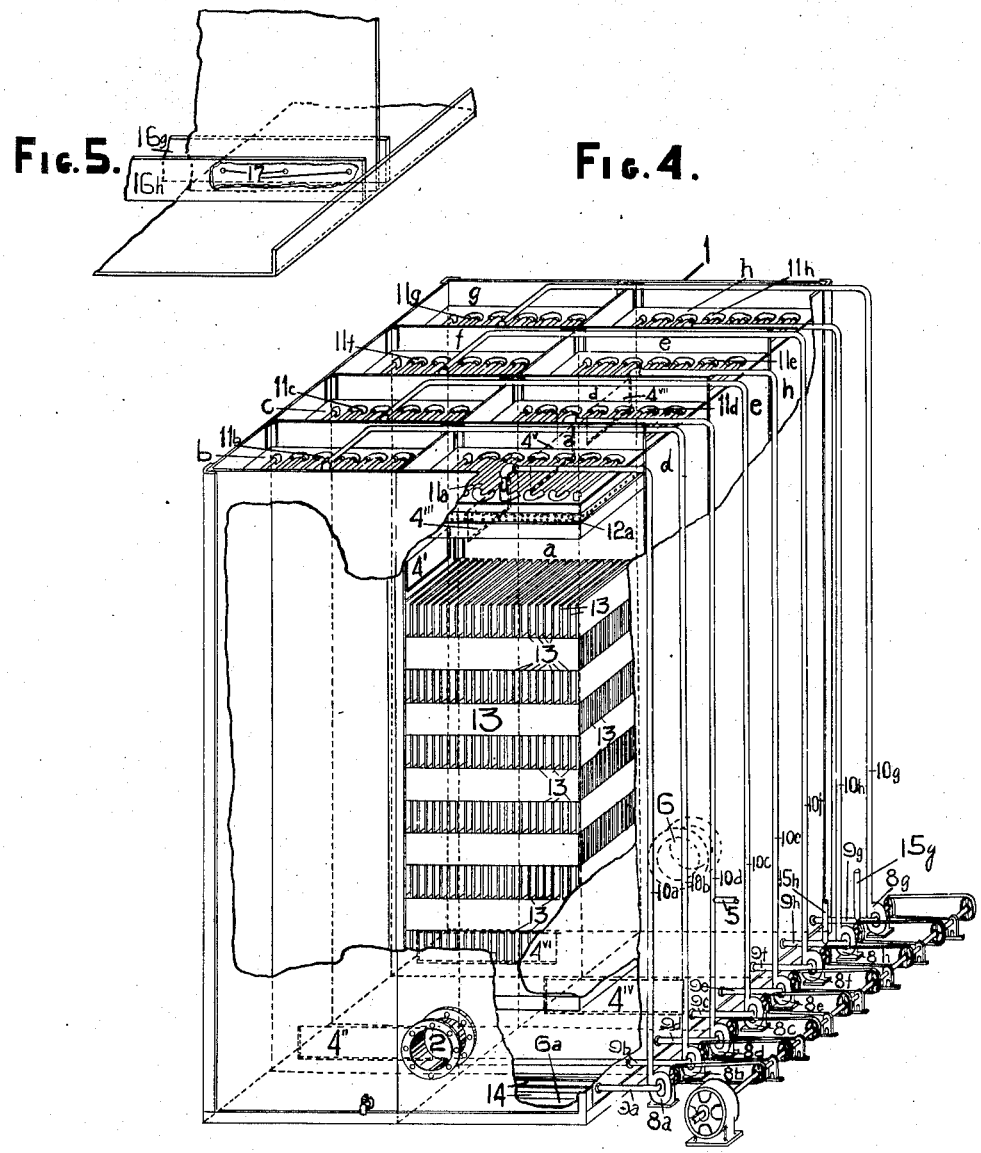

UNITED STATES PATENT OFFICE.

HENRY L. DOHERTY, OF NEW YORK, N. Y.

PROCESS OF PURIFYING GASES.

1,038,315.          Specification of Letters Patent.     Patented Sept. 10, 1912.

Application filed February 15, 1910. Serial No. 544,093.

*To all whom it may concern:*

Be it known that I, HENRY L. DOHERTY, a citizen of the United States, and a resident of New York city, in the county of New York and State of New York, have invented certain new and useful Improvements in Processes of Purifying Gases, of which the following is a specification.

This invention relates to a process for carrying out the self-purification of gases, or, in other words, to a process for purifying gases which, in their crude state, contain ammonia, by separating the ammonia from one portion of the gas as ammonia liquor and after revivifying the liquor using it to purify another portion of the gas.

The object of my invention is to furnish a process whereby coal gas, producer gas, etc., may be purified without the use of any materials other than materials which are carried by the crude gases themselves, thus doing away with the, at present, necessary outlay for extraneous purifying materials.

Another, but subordinate, object of my invention is the substitution of fluid purifying agents for solid, whereby the entire handling and circulation of the materials may be performed by pumps and without any manual labor.

In the accompanying drawings I have shown, in rather diagrammatic arrangement, a form of apparatus suitable for carrying out my process.

Figure 1 is a diagrammatic elevation of the apparatus used in purifying the different liquors used in scrubbing the gas. Fig. 2 is a vertical diametral, part section through the ammonia liquor purifying still, showing the method by which the gases evolved in the still are contacted with an oppositely flowing current of liquor. Fig. 3 is a similar section through one of the boiling chambers of the still. Fig. 4 is a perspective view of the gas washing and cooling apparatus. Fig. 5 is a partial view of the arrangement by which the scrubbing liquid is permitted to find its way from one compartment of the washer-cooler to the next in series.

The method of carrying out my process in the apparatus shown is as follows:—The foul gas to be purified enters compartment *a* of the washer-cooler 1, through the pipe 2. The compartments of 1 are, preferably, filled with some form of grids, 13, or distributing trays of some sort, adapted to break up the liquid falling through the compartment in such a manner that it passes downward through the compartment as a rain or a plurality of film-like streams. In this way a large extent of liquid surface is exposed to the gas and intimate contact between the gas and liquid secured. The specific scrubbing apparatus, which I prefer to use, and have here shown, is that covered by U. S. Letters Patent to me No. 855,448, dated June 4th, 1907. If preferred, however, any other efficient form of apparatus may be substituted for this in carrying out my process.

In the preferred way of carrying out my process, I first subject the gas—say in compartments *a*, *b* and *c*—to an initial scrubbing and cooling by contacting it with coal-tar oils. This step is particularly applicable to the purification of illuminating gas and is designed, chiefly, to eliminate naphthalene, as well as to reduce the gas to a temperature at which the subsequent scrubbing with partially purified ammonia liquor becomes effective. The gas enters compartment *a*, passes up through the same, through the port 4' to the upper part of compartment *b*, through the port 4'' to the lower part of compartment *c*, up through *c*, through the port 4''' to the upper part of compartment *d*, and so on through the upper and lower communicating ports, alternately, until it finally discharges through the pipe 6.

In the arrangement shown, the gas is first contacted with the ammonia liquor in compartment *d*. Here it is scrubbed by the nearly saturated liquor just before the latter is withdrawn from the washer-cooler through the pipe 5. In this compartment the liquor is fully saturated with the impurities of the gas at the temperature and pressure prevailing in compartment *d*. The surplus saturated liquor is withdrawn from the liquid-collecting cistern at the bottom of compartment *d*, and flows to the ammonia-liquor purifying plant 7. Here it is treated in the manner described later, in such a way that it is divided into three separate currents, two of which are returned to the washer-cooler, 1. The main body of liquor is comprised in current A, which contains a large proportion of its ammonia in the free or hydrated condition (NH$_3$ or NH$_4$OH). The actual proportion of the total ammonia, which is present in this current, will depend upon various circumstances which will be described later. As I usually conduct the ammonia purifying operation, the proportion of the total ammonia, which is present in the free condition, is from 50 to 60 per cent. This current A is returned to the cooling coils of the next to the last compartment of the washer-cooler—$g$, in the construction shown. After passing through the cooling coil of $g$, the liquor enters the distributing device in the upper part of $g$ and then descends in contact with the nearly purified gas passing through $g$.

Current B is composed of liquor from which substantially all of the volatilizable ammonia has been driven off. This current passes through the cooling coils of the last compartment, $h$, of the washer-cooler and thence to the distributing device in the upper part of $h$ and down through $h$. The gas passing through $h$ will have had nearly all of its impurities eliminated before reaching this compartment. Here the last traces of ammonia will be absorbed from the gas by the current B which enters the compartment $h$, substantially, free from volatile ammonia. Owing to the vapor tension possessed by ammonia, even in relatively dilute solutions, current A cannot be used for the removal of the last traces of ammonia from the gas. In ordinary gas works practice, this is accomplished by the use of pure water. The use of extraneous water, however, is objectionable in that it necessarily occasions a dilution of the ammonia liquor formed. Ordinarily, the amount of water formed is amply sufficient to hold all of the simultaneously-formed ammonia in solution, at the temperature at which the gas is discharging from the scrubbing apparatus. Owing, however, to the vapor tension of the ammonia, the automatically-formed ammonia liquor cannot remove the last traces of gaseous ammonia from the gas. By my method of removing substantially all of the volatile ammonia from a portion of the gas liquor and using the so-treated liquor to remove the last traces of ammonia from the gas, I am able to secure the same results as when using fresh water for the final scrubbing and, thereby, avoid the dilution of the liquor formed.

The liquor does not simply flow directly through the different compartments of the washer-cooler in a stream of uniform volume, but there is maintained in circulation in each compartment a body of liquor much greater than the quantity flowing from one compartment to the next. Each compartment has a special circulating pump, the pumps being numbered $8_a$, $8_b$, $8_c$, etc., the subscript denoting the compartment to which each pump is connected. Suction pipes, $9_a$, $9_b$, $9_c$, etc., connect the respective pumps with the liquid-collecting cistern of the corresponding compartment. Discharge pipe $10_a$, $10_b$, $10_c$, etc., conduct the discharge from the several pumps to the respective cooling coils $11_a$, $11_b$, $11_c$, etc. From the cooling coils the liquor is discharged upon perforated trays $12_a$, $12_b$, $12_c$, etc., or other equivalent distributing devices. From these, it falls in a great number of fine streams uniformly distributed across the horizontal section of the compartment, onto the grids 13 (or equivalent device). The liquid flows down through the compartment from grid to grid absorbing the impurities of the gas and drips from the last grid onto the "splash-boards" 14, from which the liquid flows quietly to the respective cisterns $6_a$, $6_b$, $6_c$, etc. From these it is again drawn by the pumps $8_a$, $8_b$, $8_c$, etc., and raised to the respective cooling coils $11_a$, $11_b$, $11_c$, etc., to again pass down through the corresponding compartment. As the volume of the liquid circulating in the compartments $g$ and $h$ is increased by currents B and A, a volume of liquid corresponding to the increment received flows from one compartment to the next through the connecting seal, finally reaching the liquid-collecting-cistern $6_d$. The flow from chamber to chamber is also increased by the condensation from the gas. The liquid seal device between the chambers consists, simply, of two plates, $16_h$ and $16_g$, forming dams in the compartments $h$ and $g$, respectively, and spaced a few inches from the wall dividing the compartments. Apertures 17, in the dividing wall below the tops of the dams, permit the excess liquid to pass from compartment $h$ to compartment $g$. A similar seal permits the liquid to pass from compartment $g$ to compartment $f$, and so on to the compartment $d$. From this compartment, the liquor is withdrawn and led to the ammonia purifying plant to be regenerated.

The saturated liquor (or in as nearly saturated a condition as can be obtained) is pumped by the pump $8_d$ to the heater-cooler 19 through the pipe 5. 19 may be of any suitable construction which will provide for the transference of heat from the two currents of hot purified liquor to the cold saturated liquor. In the apparatus shown it is a common type of tubular heater having a lower and an upper tube sheet, 20 and 20', respectively, which sheets support a plurality of tubes through which the two chambers, 21, 21', are in communication. A partition, 22, divides the intertubular part of 19 into two chambers, 23, 23'. The cold saturated, or foul, liquor from the gas washer-cooler 1, enters the chamber 21 of 19, passes up through the tubes (not shown) to the chamber 21' and thence flows to the still 25. During its ascension through the tubes of 19 the foul liquor is subjected to heating by the two currents of hot purified liquor, at the same time, flowing through compartments 23, 23'. The principal impurities carried by the foul liquor-hydrogen sulfid and carbon dioxid—begin to dissociate from their ammonia combinations at about 98° and 124° Fah., respectively. Therefore the preliminary heating to which the foul liquor is subjected in 19 causes the breaking up of a portion of the ammonium sulfid and carbonate respectively with the evolution of a considerable volume of $H_2S$ and $CO_2$. These evolved gases pass through the vapor pipe 24 to one of the sections of still 25. The heated foul liquor discharges from 19 through the pipe 26 to one of the sections of 25. This ammonia-purifying still 25 is preferably constructed as follows:— The lower or retort portion of the still is made up of three heating chambers or retorts, 27, 27' and 27", with a seal section, 28, interposed between the retorts 27 and 27'. The retorts 27" and 27', are simply open chambers provided with heating coils 29" and 29', respectively. A by-pass, 30, establishes communication between the vapor spaces of the respective retorts. Overflow passages, 31, 31', 31", provide for the passage of liquor from 27 to 28, 27 to 27' and 27' to 27", respectively. The retort 27 is constructed as shown in Fig. 3. Through the bottom of 27 projects a vapor passage 32. In the bottom of 27 is a steam coil 29. Covering the end of 32 is a hood 33, imperforate in its dome-shaped portion but with perforations, 34, in its flange portion. A ring cast onto the periphery of the flange of 33 (not shown) supports 33 at the proper height above the bottom of the retort. The upper orifice of overflow 31 is arranged to be at the height above the perforated flange 33 at which it is designed to maintain the liquid in 27. The section 28, has no heating coil but is, otherwise, similar in design to 27. In its bottom is a projecting vapor passage 35, covered by a hood 36, imperforate as to its dome portion but having perforations, 37, in its flange portion. The vapors from 27' pass through the passage 35 under hood 36 and thence through the perforations 37 into the vapor space of 28, from which they pass through 32, thence through the perforations 34 and bubble through the liquor in 27, thence into the section 38'. The sections 38 are built onto retort 27 and are identical in construction to section 28, except that they are provided with overflow passages 35'. The hot foul liquor enters one of the intermediate sections of the still (38$^{VI}$ as shown). The section at which it may be entered into the still may be varied but, preferably, it is entered into that section in which the foul gases passing through the section have a temperature slightly higher than that of the foul liquor. The foul liquor passes downward from section to section being, at the same time, contacted with the current of hot foul gases passing upward from the retort sections of the still 25. In passing up through the sections, the hot gases give up part of their sensible heat to the descending liquor. This latter is gradually raised in temperature and has a further portion of its ammonium sulfid and ammonium carbonate dissociated, with the evolution of more $H_2S$ and $CO_2$. Owing to the fact that the solubility of $H_2S$ and $CO_2$ diminishes with the rise in temperature very much more rapidly than does the solubility of the ammonia, substantially all of these gases, that are freed from their ammonia combinations, are immediately evolved from the liquor while, on the other hand, nearly all of the ammonia, liberated from combination, is retained in the liquor as free or hydrated ammonia. In addition, the liquor descending through the sections 38, picks up part of the ammonia, which is present with the foul gases, having been driven off from the liquor in the retort sections of the still.

When the liquor has reached retort 27, it has already assumed a fairly high temperature. The dissociation of the ammonium salts of the foul liquor in the heater-cooler and in the sections of still 25 through which it flows, before reaching the compartment 27, causes the absorption of a considerable quantity of heat. This heat is supplied, in the case of the heater-cooler, by the hot purified liquor from 27 and, in the case of the still, by the hot vapors and gases from 27. The heat recuperation is thus greatly facilitated, and the capacity of the two pieces of apparatus increased in proportion to the heat so-rendered latent. In 27, by means of the steam coil 29, the temperature of the partially purified liquor is raised to, preferably, about 6 to 12 degrees below the boiling point of water under the pressure prevailing in 27. The exact temperature I use depends upon the pressure conditions in 27. This depends, of course, upon the altitude of the locality in which the treatment is carried out and upon the back pressure caused by the liquid seals in the compartments of the still. As stated, I prefer to carry on the treatment in compartment 27 at a temperature varying from 6 to 12 degrees below the boiling temperature under the pressure prevailing in 27. For example, if the barometric pressure in 27 is about 25.9 inches of mercury, I would preferably maintain the temperature in 27 at about 197 to 198° Fah., while at a barometric pressure of say 31.3 inches in the compartment 27, I would preferably heat the liquor therein at a temperature of about 204° to 206° Fah. While purification can be effected considerably below this temperature, I find the rate of purification at a lower temperature so slow that, ordinarily, I do not consider it advisable to use temperatures lower than that given, although the separation of the foul gases and the ammonia may be, thereby, made with less loss of ammonia in the one operation. At this range of temperature, 197° to 204°, the decomposition of the ammonium sulfid and carbonate is very rapid. The freed foul gases pass off very rapidly from the liquor, setting up a pseudo ebullition. A portion of the $NH_3$ also passes off with the foul gases, the carrying off of the ammonia being, in part, mechanical. That is to say, the foul gases, so to speak, entangle a portion of the ammonia freed in the bubbles which they form and prevent it coming into sufficiently intimate contact with the liquor to permit of its absorption by the latter. For this reason, were the treatment in retort 27 depended upon for the purification of the main stream of liquor, the latter would never be secured in the condition of saturation at the temperature prevailing in 27. By the device which I use, however, of passing a current of gases stronger in ammonia, which is formed in the retorts 27' and 27'', through that portion of the purified liquor which is returned to compartment $g$ of the washer-cooler, I am able to withdraw this current of liquor from the still, through the pipe 39, practically saturated with $NH_3$ at the temperature which it possesses in 28.

The partially purified liquor discharging from 27 is divided into two currents. The main current, which I designate as current A, passes through the overflow 31 into the section 28. The other current passes through the connection 31', having a valve $31_v$, into the retort 27'. Here, it is subjected to active boiling until nearly all of its volatilizable ammonia has been driven off. The liquor, freed from most of its volatilizable ammonia and acid constituents, discharging from 27' is sub-divided into two portions—the main current being withdrawn through the pipe 40, while the minor current passes through the overflow 31'' into the liming retort 27''. As it discharges from the overflow 31'' it mingles with a stream of milk of lime entering through the pipe 50. The lime is supplied in a proportion considerably in excess of the combined acids of the fixed ammonium salts, which are present in the liquor flowing to 27'', liberating the ammonia of these salts, which, with the steam formed, passes through the vapor pipe 30, into the vapor space of 27', where it joins the vapors there evolved and passes with them through the main current of purified liquor in 28, a portion of the $NH_3$ of the gases being absorbed by the liquor in 28. If preferred, the ammonia liberated in 27'' may be led off through a pipe 41 and used to form a fairly pure ammonia liquor. The liquor withdrawn from 27'', which should have been deprived of substantially all of its ammonia, is run to waste through the pipe 42.

The partially purified liquor drawn off from 28 through the pipe 39, is forced by pump 42 to the larger intertubular compartment 23 of heater-cooler 19. In passing through 23, it is cooled by the cold foul liquor passing through the tubes of 19, and discharging from 23 passes through the pipe $15_g$ to the circulating pump $8_g$ of compartment $g$ of washer-cooler 1. The portion of the liquor, freed from substantially all of its volatilizable ammonia, which is withdrawn from 27' through the pipe 40, passes to the pump 43, and is forced, thereby, to the upper part of intertubular compartment 23' of heater-cooler 19. It passes down through 23' and discharges through 44 to the pump 45. The liquor discharging from 45, is sub-divided into two streams—the larger stream passing through the pipe $15_h$ to the circulating pump of compartment $h$, thence, with the body of liquor in circulation in $h$, through the cooling coil $11_h$, and into the gas chamber $h$, where it is used to remove the last traces of ammonia from the gas as already described. The smaller stream of the liquor, substantially free from volatilizable gases, passes through the pipe 44' to the cooling coil 46. 46 is cooled by cold water dripping over it from the distributing trough 47, or in any other preferred manner. The cold liquor of this last mentioned stream, discharges into the uppermost section of still 25, and overflows from section to section until it reaches (in the arrangement shown) the section $38^{ix}$. During its descent through the sections, it is contacted with the foul gases passing upward through the still, and absorbs from them the last traces of the ammonia which they carry and also portions of the fouling gases themselves, which portions of the gases re-combine with the ammonia as the temperature falls and pass, with the ammonia, into the liquor. From section $38^{ix}$ (or any other one above the one into which 26 is connected, that I prefer) I withdraw all, or a portion, of this current of liquor through the pipe 49, having a valve 49', and conduct it to storage, or dispose of it in any advantageous manner. I aim to so regulate the operations that I draw off through 49 a portion of liquor which, with that discharging through 42, will equal the increment of liquid received by the system, and will carry a proportion of ammonia corresponding, approximately, to the ammonia increment received by the system. It is necessary to enter into the upper section ($38^{xiv}$ as shown) sufficient cold liquor, free from volatilizable ammonia, to re-absorb all the ammonia in the foul gases. Any excess liquor over that which I wish to withdraw, I permit to overflow from compartment 38^ix and pass down through the sections below joining the foul liquor entering through 26. The foul gases, discharging from 25 through the pipe 48 may either be allowed to waste, or be treated as desired.

While it is advantageous to have the liquor, withdrawn through 39, contain the highest proportion of its ammonia, practicable, in the free or hydrated condition, I find that, practically, a liquor containing from 50 to 60% of its ammonia in the free condition will meet all requirements in the second scrubbing of the gas in washer-cooler 1. The proportions of the hydrogen sulfid and carbon dioxid eliminated from the foul liquor in its passage through the still 25 to pipe 39 is about 55 to 65% in each case. At the same time I aim to eliminate from the liquor a proportion of its ammonia that corresponds to the ammonia increment of the system. The proportion of the ammonia eliminated may be controlled by varying the temperature to which the liquor is subjected in 27. Usually, the proportion of ammonia eliminated will be between 5 and 10% of the total ammonia in the liquor.

As previously explained, the compartments $a$, $b$ and $c$, in the arrangement shown, are used for the first scrubbing of the gas. This is preferably done with coal tar oils recovered from a previously treated portion of the gas. By this treatment, I am able to cool the gas down to a temperature at which the ammonia scrubbing becomes effective, say, below 120° Fah. In ($a$) I prefer to use hot tar oils, while in $b$ and $c$ the tar oil is cooled by the coils shown sufficiently to reduce the temperature of the gas passing into $d$ down to the point given. By the tar washing, I am able to remove the bulk of the naphthalene from the gas.

Having described my invention, what I claim is:

1. The process of purifying foul gas which comprises, scrubbing said gas with ammonia liquor containing a substantial proportion of hydrated ammonia, whereby acid impurities in said gas are taken into combination by said hydrated ammonia, withdrawing the ammonia liquor from contact with said gas, separating from said liquor the major portion of its acid constituents while retaining in said liquor the major portion of its ammonia, by heating said liquor, whereby hydrated ammonia is regenerated in said liquor, and re-using said regenerated liquor to scrub another portion of said foul gas.

2. The process of purifying foul gas which comprises, scrubbing said gas with ammonia liquor containing a substantial proportion of hydrated ammonia, whereby acid impurities in said gas are taken into combination by said hydrated ammonia, withdrawing the ammonia liquor from contact with said gas, regenerating said liquor by heating the same to separate therefrom the major portion of its acid constituents while retaining therein the major portion of its ammonia, separating the regenerated liquor into two streams, scrubbing a fresh portion of foul gas with the liquor in one of these streams, subjecting the other of these streams to heating to free it from substantially all of its volatilizable gases, and subjecting the gas scrubbed by the first of the said streams to further scrubbing by the other of said streams after the same has been freed from its volatilizable gases.

3. The process of purifying foul gas which comprises, scrubbing said gas with ammonia liquor containing a substantial proportion of hydrated ammonia, whereby acid impurities in said gas are taken into combination by said hydrated ammonia, withdrawing the ammonia liquor from contact with said gas, regenerating said liquor by heating the same to separate therefrom the major portion of its acid constituents while retaining therein the major portion of its ammonia, dividing the regenerated liquor into two portions, scrubbing another body of foul gas with a portion of said regenerated liquor, heating the other portion of the regenerated liquor to eliminate volatilizable gases therefrom, subdividing the liquor from which volatilizable gases have been eliminated into two streams, using one of these streams to re-absorb the ammonia separated from said liquor with said acid gases, and the other of said streams to scrub the gas after the same has been scrubbed by the first-treated liquid.

4. The process of purifying foul coal gas by substances obtained from the said gas, which comprises scrubbing the foul gas successively by two portions of treated liquid condensation from a previously made volume of said gas, the first portion of said liquid condensation having been treated to free it from the major part of its acid constituents, the other portion of said liquid condensation having been treated to free it from, substantially, all of its volatilizable gases, and withdrawing from the system the surplus ammonia and liquid by treating another portion of liquid condensation to free it from substantially all of its volatilizable gases, and using it to absorb said surplus ammonia.

5. The process of purifying foul coal gas which comprises absorbing the fouling constituents of the gas in treated liquid condensation from a previously made volume of gas, heating the liquid condensation containing the fouling constituents at a temperature below 200° Fah., whereby the major portion of the $CO_2$ and $H_2S$ contained in the liquid condensation is eliminated therefrom, and the said liquid purified, while the major portion of the ammonia is retained therein, cooling a portion of the so-purified liquid condensation and using it to absorb the fouling constituents from a fresh portion of foul gas, subjecting the remaining portion of the so-heated liquid to boiling to eliminate therefrom the volatilizable ammonia, subdividing this portion of liquid into two streams, using one of these streams to absorb the ammonia from the gases evolved from the said liquid condensation on heating, and using the other of these streams to absorb the final portion of the ammonia from said coal gas after it has been scrubbed by said purified liquid.

6. The process of purifying foul gas which comprises contacting said gas with a liquor containing free ammonia, whereby the ammonia and other impurities of said gas are absorbed in said liquor and said liquor fouled, withdrawing said liquor from contact with said gas, subjecting said liquor to heating, whereby part of the ammonia, hydrogen sulfid and carbon dioxid held by said liquor is evolved therefrom, and the said liquor purified, dividing the said purified liquor into two portions, cooling one of these portions and contacting it with a fresh volume of foul gas, subjecting the other portion of said purified liquor to boiling to drive off from said portion of liquor, substantially, all of its volatilizable ammonia, subdividing said portion of liquor into two streams, using one of these streams to absorb the ammonia from the gases evolved in the heating of said fouled liquor and contacting the other stream of said liquor, freed from substantially all of its volatilizable ammonia, with said fresh volume of foul gas after the same has been contacted with said purified liquor.

7. The process of purifying foul gas which comprises contacting said gas with liquor containing free ammonia, whereby the major portion of the ammonia and other impurities of said gas are absorbed in said liquor and said liquor fouled, withdrawing said foul liquor from contact with said gas, subjecting said foul liquor to a preliminary heating by a current of purified liquor, whereby said purified liquor is cooled, further heating said foul liquor to a temperature above the dissociation temperature of its contained ammonium carbonate but below its boiling temperature, whereby the major portion of the hydrogen sulfid and carbon dioxid of said foul liquor is evolved therefrom and said liquor purified, dividing said purified liquor into two portions, cooling one of these portions, by a fresh portion of foul liquor, and contacting said cooled portion of purified liquor with a fresh volume of foul gas, subjecting the other portion of said purified liquor to a boiling temperature, whereby substantially all of its volatilizable ammonia is evolved therefrom, conducting the evolved ammonia into a fresh portion of purified liquor, subdividing the boiled liquor, freed from substantially all of its volatilizable ammonia into two streams, cooling one of these streams by a fresh portion of foul liquor, subdividing said stream of cooled liquor into two portions, contacting one of these portions with the gases evolved in the heating of another portion of foul liquor to recover the contained ammonia therefrom, contacting the other portion of said liquor with a fresh portion of foul gas after the latter has been contacted with said portion of purified liquor, whereby said gas is freed from substantially all of its impurities, subjecting the other of these streams of purified liquor, freed from its volatilizable ammonia, to boiling with lime, whereby the fixed ammonium salts in said portion of liquor are dissociated and their ammonia evolved, and passing the so-evolved ammonia into a fresh portion of purified liquor.

8. The process of purifying foul gas which comprises scrubbing said foul gas with liquor containing free ammonia, whereby the free ammonia in said liquor is saturated with the fouling constituents of the gas, withdrawing said saturated liquor from contact with said foul gas, subjecting said saturated liquor to heating by a current of hot purified liquor, further heating said saturated liquor by contacting the same with the hot gases evolved in the purification of a previous portion of saturated liquor, purifying the so-heated liquor by subjecting the same to a temperature of between 190° and 200° Fah., whereby the major portion of the hydrogen sulfid and the major portion of the carbon dioxid of said liquor are evolved therefrom together with a relatively small proportion of the ammonia content of said liquor, whereby a substantial proportion of the ammonia content of said liquor is re-converted to free or hydrated ammonia, dividing the so-purified liquor into two streams, cooling one of these streams by transferring its heat to a fresh portion of saturated liquor and contacting the cooled purified liquor with a fresh portion of foul gas, subjecting the other portion of said purified liquor to boiling, whereby substantially all of its volatilizable ammonia is evolved therefrom, conducting the evolved ammonia into a fresh portion of purified liquor, subdividing the boiled liquor freed from substantially all of its volatilizable ammonia into three parts, the volume of the first of these parts being equal to that required to re-absorb the ammonia content of the gases evolved in the heating of the saturated liquor, and the volume of the second of these parts being approximately equal to the difference in volume of the liquid condensed from the gas and said first part, cooling said first part and contacting it with the gases evolved in the heating of a fresh portion of saturated liquor, to absorb the ammonia therefrom, boiling the said second part with lime to dissociate the fixed ammonium salts thereof and to volatilize the ammonia, contacting the volatilized ammonia with a fresh portion of purified liquor, cooling the remaining portion of said boiled purified liquor freed from substantially all of its volatilizable ammonia and contacting the same with a fresh portion of foul gas after the latter has been scrubbed by said purified liquor.

9. The process of purifying foul gas which comprises heating the liquid condensed from a previously formed portion of said gas to separate from said liquid the major portion of its acid constituents while retaining in said liquid the major portion of its ammonia, whereby a substantial proportion of the ammonia of said liquid is converted into free or hydrated ammonia, withdrawing from the body of condensed liquid the proportion of ammonia and liquid corresponding to the increments of said substances received by said body of liquid from said gas, and scrubbing a fresh portion of foul gas by the residual treated liquid.

10. The process of purifying foul gas which comprises scrubbing said gas with an ammoniacal liquor containing a substantial proportion of its ammonia in the free or hydrated condition, whereby the major portion of the previously free ammonia is saturated with the acid gases of said foul gas, withdrawing the said saturated liquor from contact with the scrubbed gas, re-converting a substantial proportion of the ammonia of said saturated liquid into the free or hydrated condition by heating the same at a temperature above the dissociation temperature of its contained ammonium carbonate but below the boiling temperature of said liquor, cooling the major portion of said purified liquor and contacting it with a fresh portion of foul gas, subjecting the minor portion of said purified liquor to boiling to eliminate therefrom substantially all of its volatilizable ammonia, conducting the so-volatilized ammonia into a fresh portion of liquor while the same is undergoing purification to increase the proportion of free ammonia therein, and continuously withdrawing from the body of liquor in circulation a volume of liquor and ammonia substantially equal to the increments of said substances received by said liquor from said foul gas.

11. The process of purifying foul gas which comprises contacting said gas first, with coal tar oils derived from a previously treated portion of foul gas, second, with a liquor containing a substantial proportion of free or hydrated ammonia, said liquor being derived from the partial purification of ammonia liquor derived from a previously treated portion of said foul gas, and third, with a liquor substantially free from volatilizable ammonia, said liquor substantially free from volatilizable ammonia being derived from the treatment of a portion of said liquor containing a substantial proportion of free or hydrated ammonia.

12. The process of purifying foul gas which comprises contacting said gas first, with a suitable cooling liquid whereby the temperature of said foul gas is reduced to a temperature below 124° Fah., second, with a liquor containing a substantial proportion of free or hydrated ammonia, said liquor being derived from the partial purification of ammonia liquor condensed from a previously treated portion of said foul gas, and third, with a liquor substantially free from volatilizable ammonia, said liquor substantially free from volatilizable ammonia being derived from the treatment of a portion of said liquor containing a substantial proportion of free or hydrated ammonia.

13. The process of purifying foul gas which comprises contacting said gas first, with a substance capable of absorbing naphthalene, second, with a liquor containing a substantial proportion of free or hydrated ammonia, said liquor being derived from the partial purification of ammonia liquor condensed from a previously treated portion of said foul gas, and, third, with a liquor substantially free from volatilizable ammonia, said liquor substantially free from volatilizable ammonia being derived from the treatment of a portion of said liquor containing a substantial proportion of free or hydrated ammonia.

14. The process of purifying foul gas which comprises contacting said gas first, with a cooling liquid which is at the same time capable of absorbing naphthalene, whereby the said gas is reduced to a temperature below 124° Fah. and freed from the major portion of its naphthalene, second, with a liquor containing a substantial proportion of free or hydrated ammonia, said liquor being derived from the partial purification of ammonia liquor condensed from a previously treated portion of said foul gas, and third, with a liquor substantially free from volatilizable ammonia, said liquor substantially free from volatilizable ammonia being derived from the treatment of a portion of said liquor containing a substantial proportion of free or hydrated ammonia.

15. The process of purifying foul gas which comprises contacting said gas, first, with a cooling liquid which is at the same time capable of absorbing naphthalene, whereby the said gas is reduced to a temperature below 124° Fah., and freed from the major portion of its naphthalene, second, with a liquor containing a proportion of free or hydrated ammonia sufficient to combine with substantially all of the hydrogen sulfid and carbon-dioxid of said foul gas, whereby nearly all of said impurities are removed from said gas, and third, with a liquid substantially free from volatilizable ammonia, whereby substantially all of the impurities remaining in said gas after the said gas has been contacted with the said liquor containing free or hydrated ammonia, are removed from said gas.

16. The process of purifying foul gas which comprises scrubbing said gas, first, with a cooling liquid which is at the same time capable of absorbing naphthalene from said gas, whereby the said foul gas is reduced to a temperature of, at least, 124° Fah., and the major portion of the naphthalene is removed therefrom, second, with an ammoniacal liquor containing a substantial proportion of its ammonia in the free or hydrated condition, whereby the major portion of the previously free ammonia in said liquor is saturated with the acid gases of said foul gas, withdrawing the said saturated liquor from contact with the scrubbed gas, re-converting a substantial proportion of the ammonia of said saturated liquor into the free or hydrated condition by heating the same at a temperature above the dissociation temperature of its contained ammonium carbonate, but below the boiling temperature of said liquor, cooling the major portion of said purified liquor and contacting it with a fresh portion of foul gas, subjecting the minor portion of said purified liquor to boiling to eliminate therefrom, substantially all of its volatilizable ammonia, conducting the so-volatilized ammonia into a fresh portion of liquor while the same is undergoing purification to increase the proportion of free ammonia therein, and continuously withdrawing from the body of liquor in circulation a volume of liquor and ammonia, substantially equal to the increments of said substances received by said liquor from said foul gas.

Signed at New York city in the county of New York and State of New York this 12th day of Feb. A. D. 1910.

HENRY L. DOHERTY.

Witnesses:
L. G. COLEMAN,
THOS. I. CARTER.